United States Patent [19]
Osman

[11] Patent Number: 5,088,239
[45] Date of Patent: Feb. 18, 1992

[54] MONITORING A MACHINING OPERATION
[75] Inventor: John M. Osman, Bristol, England
[73] Assignee: Rolls-Royce plc, London, England
[21] Appl. No.: 651,935
[22] Filed: Feb. 7, 1991
[30] Foreign Application Priority Data
Feb. 14, 1990 [GB] United Kingdom ............. 9003338
[51] Int. Cl.$^5$ .................................... B24B 49/00
[52] U.S. Cl. ......................... 51/165.71; 51/165.74;
51/165.76; 51/131.1; 51/326
[58] Field of Search ........... 51/165 R, 165.71, 165.76,
51/165.74, 326, 131.1, 131.3, 134, 129, 109 R;
33/710; 364/474.06

[56] References Cited
U.S. PATENT DOCUMENTS

| | | | |
|---|---|---|---|
| 4,045,919 | 9/1977 | Moritomo | 51/134.5 |
| 4,433,510 | 2/1984 | Katagiri et al. | 51/118 |
| 4,905,422 | 3/1990 | Panotti | 51/165.71 |
| 4,930,262 | 6/1990 | Sennewald | 51/165.76 |
| 4,934,105 | 6/1990 | Sigg | 51/165.71 |
| 4,962,616 | 10/1990 | Wittstock | 51/165.71 |

FOREIGN PATENT DOCUMENTS
2124386  2/1984 United Kingdom .

Primary Examiner—M. Rachuba
Attorney, Agent, or Firm—Oliff & Berridge

[57] ABSTRACT

A distance sensor is arranged to be moveable relative to a workpiece, during a machining operation this movement having a limit at a position where a finished workpiece would be within an accurate measuring range of the sensor. As machining progresses the sensor is moved towards the workpiece, stopping either when the separation of sensor and workpiece reaches a pre-set value of when the sensor reaches the limit of its movement. If the separation of sensor and workpiece reaches the pre-set value the sensor is moved away from the workpiece and then towards it again, repeating the cycle. If the sensor reaches the limit of its movement it remains in this position and measures its separation from the workpiece for the remainder of the machining operation.

9 Claims, 4 Drawing Sheets

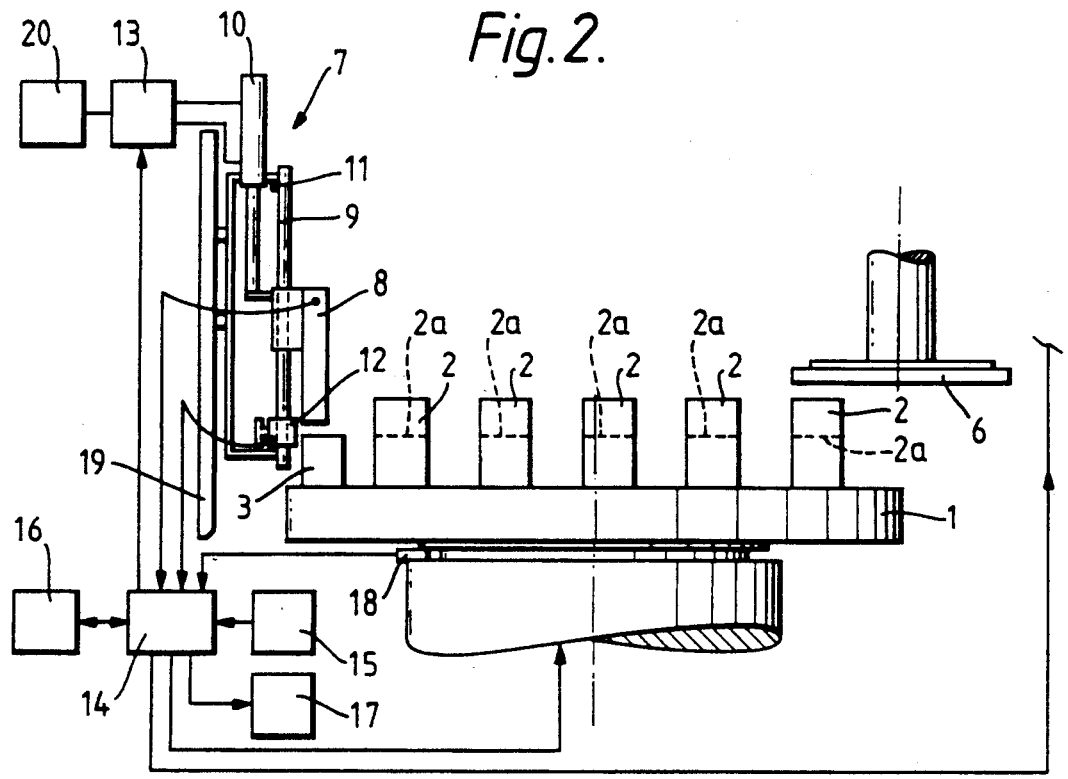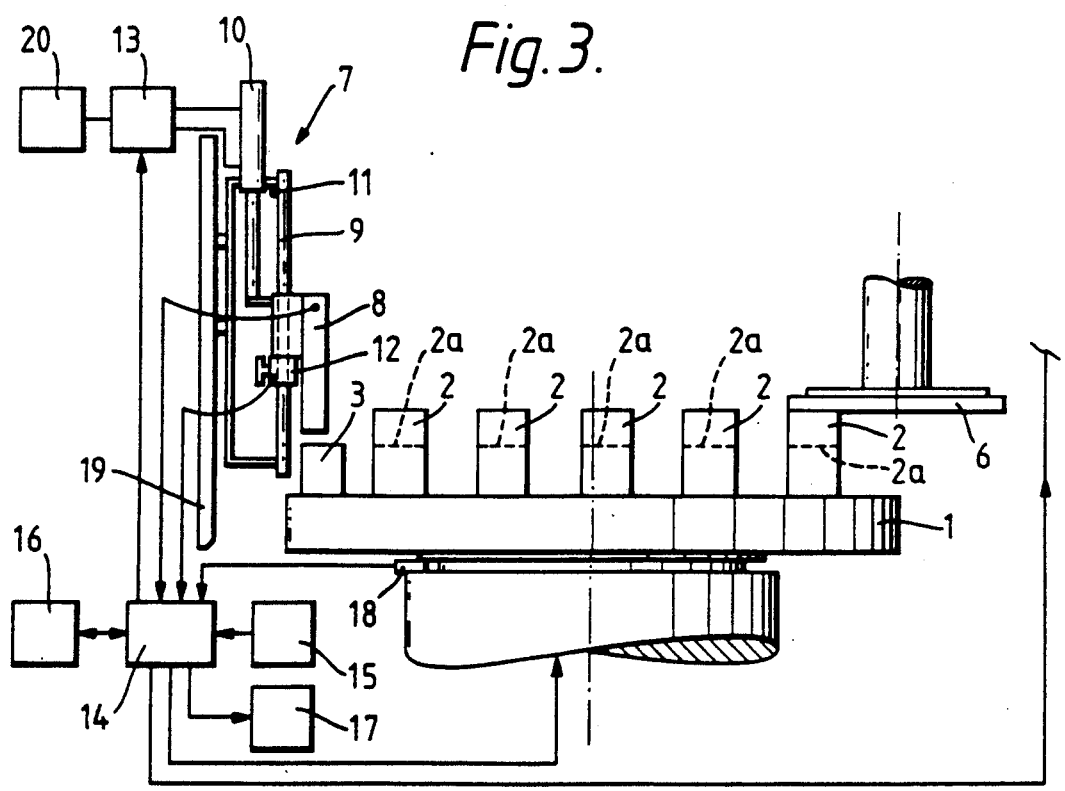

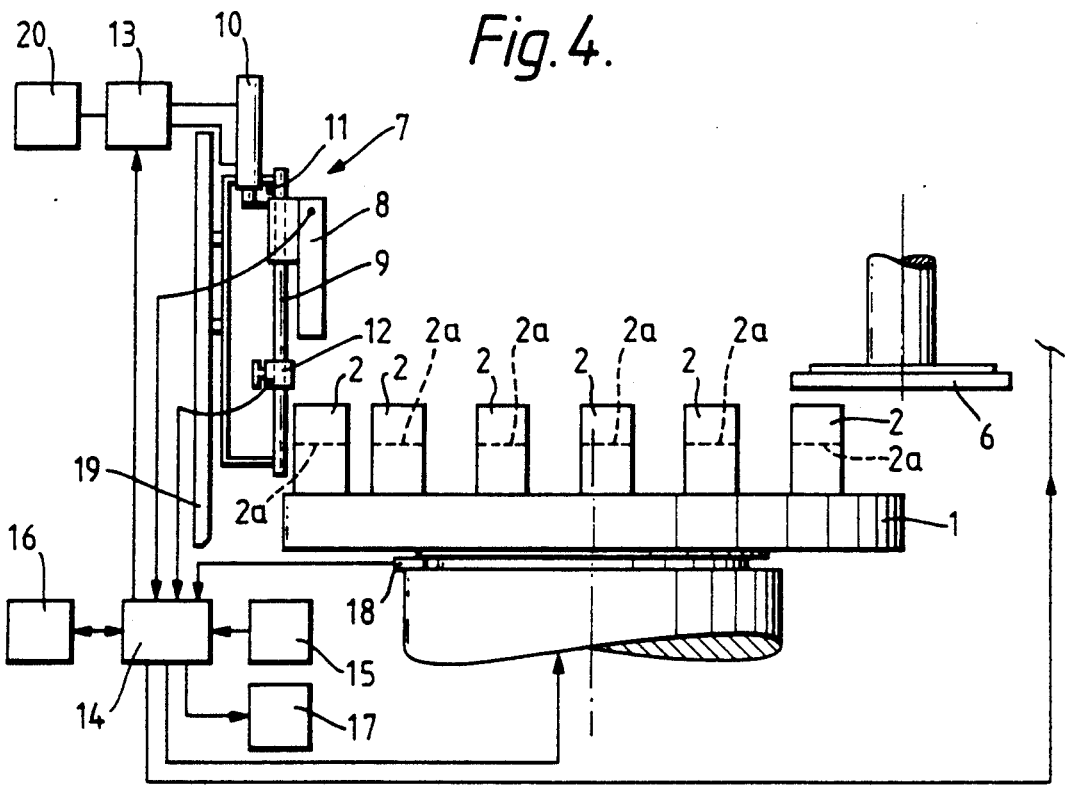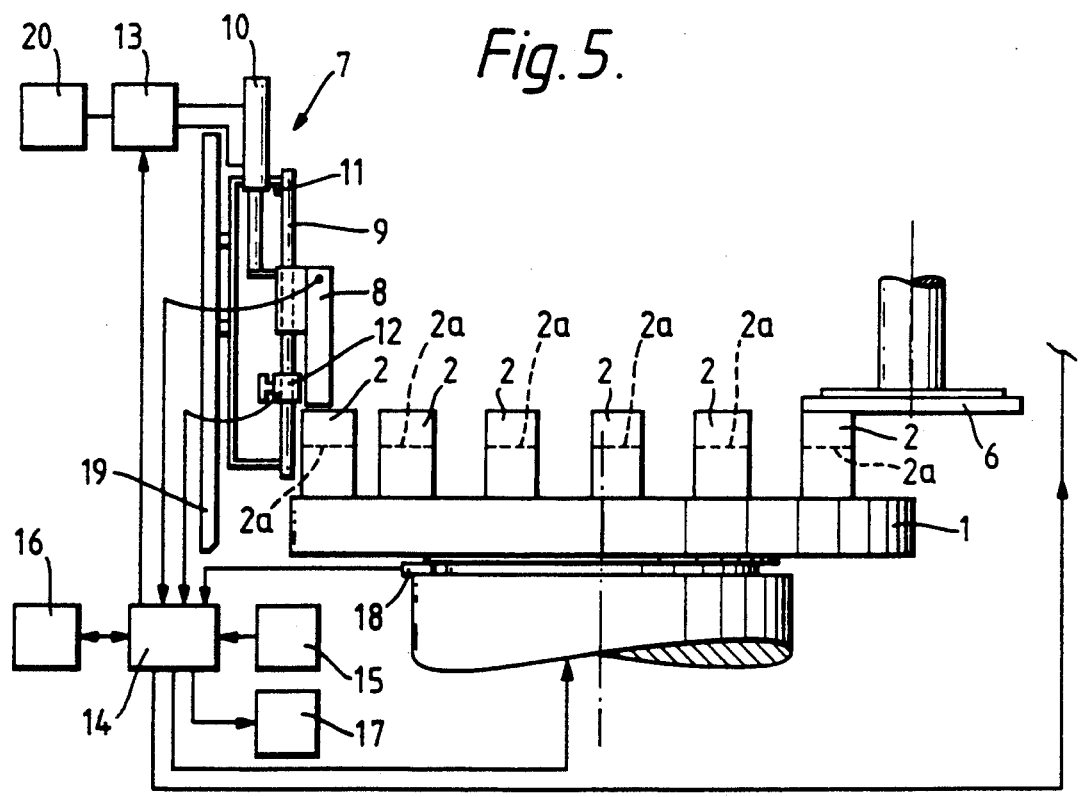

MONITORING A MACHINING OPERATION

FIELD OF THE INVENTION

This invention relates to a method of monitoring the progress of a machining operation and particularly a grinding operation.

In such operations it is desirable to use eddy current distance measuring devices to measure the size of the workpiece because eddy current devices operate without contact with the workplace and can be completely sealed.

DESCRIPTION OF THE PRIOR ART

A grinding system employing an eddy current distance measuring device is shown in FIG. 1.

A rotating machine table 1 supports a number of similar components 2 and a datum block 3. The datum block 3 has a height equal to the desired height of a component 2 after grinding.

An eddy current distance sensor 5 is held at a fixed height above the machine table 1, over the circular path followed by the components 2 and datum block 3. As the table 1 rotates a grinding wheel 6 is used to machine the upper surfaces of the components 2.

On each rotation of the table 1, as each of the components 2 and the datum block 3 passes beneath the eddy current distance sensor 5, the sensor measures the distance to the tops of the components 2 and the datum block 3. When the distances between the eddy current sensor 5 and the components 2 are the same as the distance between the eddy current sensor 5 and the datum block 3 the components 2 are the same size as the datum block 3 and the grinding process can be stopped. These measurements must be made when the eddy current sensor 5 lies completely over one of the components 2 or the datum block 3.

There are a number of problems with this system. The first is that the accuracy of an eddy current distance measuring device drops with distance, as a result when large quantities of metal are removed from the components 2 the accuracy with which the eddy current sensor 5 can measure the distance to the tops of the components and datum blocks 3 will be unacceptably low.

Accuracy can be restored by increasing the diameter of the eddy current distance sensor 5. However this is undesirable because the larger the diameter of the eddy current distance sensor 5 becomes the harder it is to ensure that the eddy current sensor 5 lies completely over one of the components 2 or the datum block 3, as is necessary for accurate measurement, especially when the eddy current sensor 5 and the components 2 are of similar sizes.

Another problem is that the datum block 3 is sometimes accidentally ground down by the grinding wheel 6, this results in the components 2 being finished to the new, too small, size of the datum block 3 making them useless.

BRIEF SUMMARY OF THE INVENTION

This invention is intended to provide a measurement system at least partially overcoming these problems.

This invention provides a method of monitoring the progress of a machining operation on a workpiece using a distance sensor supported by a supporting structure allowing movement of the sensor relative to the workpiece, this movement having a limit at a position where a workpiece having a dimension the same as that of a machined workpiece would be within an accurate measuring range of the sensor, including the steps of;

(i) during the machining operation, moving the sensor towards the workpiece until the separation of the workpiece and sensor reaches a pre-set value or the sensor reaches the limit of its movement, (ii) if the separation of the workpiece and sensor reaches the pre-set value the sensor is moved away from the workpiece again and the sequence is repeated from step i, (iii) if the sensor reaches the limit of its movement it remains in this position and measures the separation of sensor and workpiece.

This allows the removal of material from the workpiece to be monitored throughout the machining operation and allows the final size of the workpiece to be accurately gauged without the sensor having to have an accurate range of operation covering the entire thickness of material removed.

BRIEF DESCRIPTION OF THE DRAWINGS

A monitoring system employing the invention will now be shown by way of example only with reference to the accompanying figures in which;

FIGS. 2 to 7 show successive stages in a grinding operation monitored by a system employing the invention, similar parts having the same reference numerals throughout.

DETAILED DESCRIPTION

Figure 1:
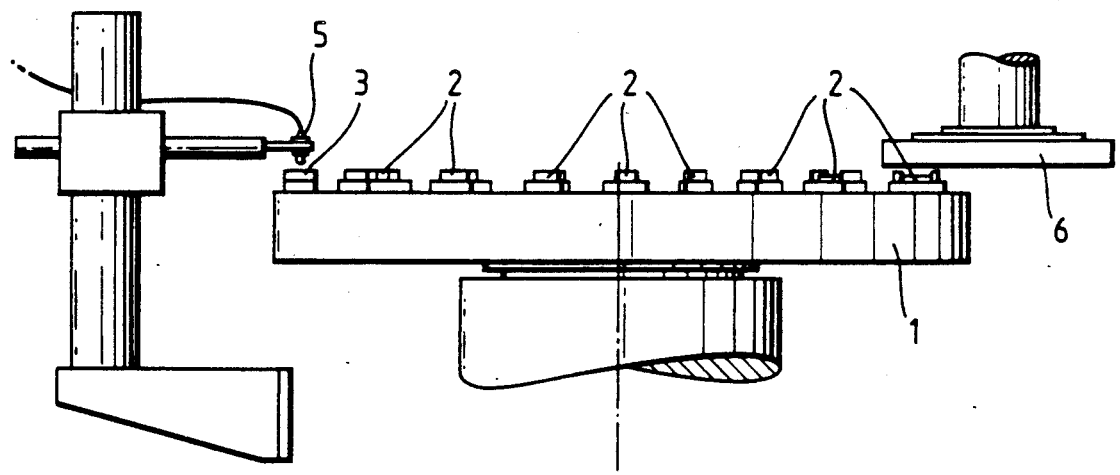
FIG. 1 shows the prior art.

Referring to FIG. 2 a grinding system including a measurement system 7 is shown. A machine table 1 supports a number of similar components 2 and can rotate to pass the components 2 under a grinding wheel as in the grinding system of FIG. 1.

The measuring system 7 includes an eddy current distance sensor 8 slidably mounted on a vertical rail 9. The eddy current distance sensor 8 can be moved along the rail 9 by a double ended pneumatic actuator 10. The range of movement of the eddy current sensor 8 is limited by a first fixed stop 11 at the top of the rail 9 and a second moveable stop 12 situated below the sensor 8 on the rail 9.

The rail 9 and pneumatic actuator 10 are both secured to a rigid post 19 which is fixed relative to the machine table 1.

The pneumatic actuator 10 is operated by a compressed air supply 20 which is supplied to the pneumatic actuator 10 by a solenoid valve 13. The solenoid valve 13 can switch the compressed air from the compressed air supply 20 to either end of the double ended pneumatic actuator 10. When the compressed air is sent to the lower end of the pneumatic actuator 10 it causes the distance sensor 8 to move up the rail 9, and when the compressed air is switched to the upper end of the pneumatic actuator 10 it causes the distance sensor 8 to move down the rail 9. The switching action of the solenoid valve 13 is controlled by an electronic processor 14 which receives the output signals from the distance sensor 8 and a rotational transducer 18 which senses the rotational position of the machine table 1. The processor 14 is also connected to a button 15, a memory device 16 and a visual display unit 17.

Initially the rotational positions of the machine table 1 in which the components 2 will be under the distance sensor 8 must be placed in the memory device 16 by rotating the machine table 1 and pressing the button 15 to signal the processor 14 each time a component 2 passes under the distance sensor 8. When the button 15 is pressed the processor 14 stores the output of the rotational transducer 18 in the memory device 16.

The clamping system used to secure the components 2 to the table 1 dictates the positions of the components 2 so the process described above will only need to be carried out if the measuring system 7 is moved, otherwise the rotational position data in the memory device 16 can be retained and re-used.

In order to calibrate the system 7 for grinding a particular type of component 2 one of the components 2 is replaced with a datum block 3 which has the same height as a machined component 2. This height is shown as a dashed line 2a on each of the components 2. The machine table 1 is then rotated until the datum block 3 is beneath the eddy current sensor 8 and the button 15 is pressed.

The processor 14 then switches the solenoid valve 13 to supply compressed air to the top of the actuator 10 so that the eddy current distance sensor 8 moves towards the datum block 3. When the signals from the eddy current distance sensor 8 indicate that the sensor 8 is close enough to the datum block 3 to allow accurate measurement of the distance between the eddy current sensor 8 and the datum block 3 the processor 14 switches the solenoid valve 13 to stop the supply of air to the actuator 10 so that the sensor 8 comes to a halt. The memory 16 contains data defining the distances over which accurate measurement can be made by the sensor 8.

The moveable stop 12 is then moved up the rail 9 into contact with the sensor 8 and is then secured in place as shown in FIG. 3, and the button 15 is pressed. In response the processor 14 stores the distance reading to the top of the datum block 3 from the sensor 8 in the memory.

When this has been done the button 15 is pressed again and in response the processor 14 switches the solenoid valve 13 to supply air to the bottom of the actuator 10 so as to return the sensor 8 to the upper end of its travel. The datum block 3 is then replaced with a component 2, as shown in FIG. 4. The button 15 is then pressed to tell the processor 14 to start the grinding cycle. The processor 14 starts the table 1 and the grinding wheel 6 rotating and moves the grinding wheel 6 down into contact with the components 2. The grinding wheel 6 then moves at a steady rate downwards, grinding away the tops of the components 2 as it goes.

As the table 1 rotates the processor 14 compares the readings from the rotational transducer 18 with the stored readings held in the memory device 16. As these readings coincide and each of the components 2 passes beneath the eddy current sensor 8 the processor 14 switches the solenoid valve 13 to supply air to the top of the actuator 10 so as to move the eddy current sensor 8 down towards the table 1, as shown in FIG. 5. As the eddy current sensor 8 approaches a component 2 the processor 14 compares the distance the sensor 8 measures between itself and the component 2 with a pre-set distance held in the memory 16. When the distance between the sensor 8 and the component 2 is equal to this pre-set distance the processor 14 switches the solenoid valve 13 to supply air to the bottom of the actuator 10 to reverse the movement of the eddy current sensor 8 and take it back u to the top of its travel.

Figure 6:
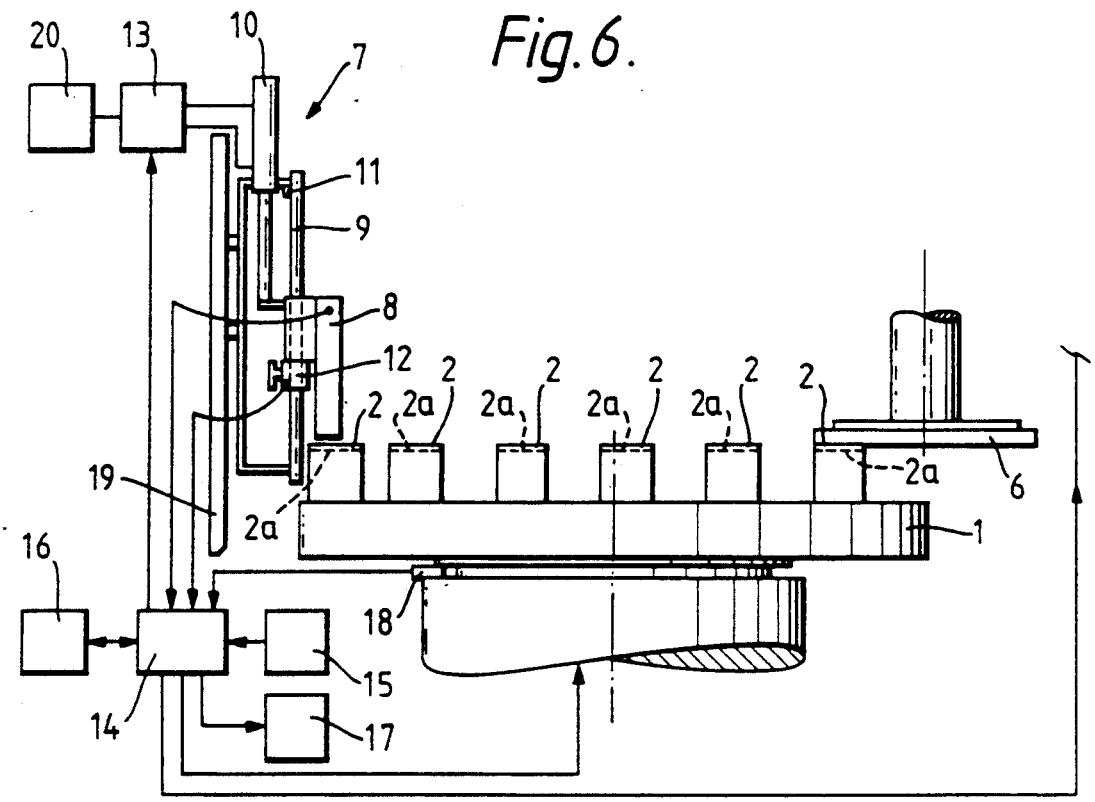

This lowering and raising of the eddy current sensor 8 continues until sufficient material has been ground off of the components 2 that the eddy current sensor 8 contacts the stop 12 before it comes as close to the components 2 as the pre-set distance held in the memory 16. When this happens a contact switch in the stop 12 signals the processor 14 and the processor 14 then switches the solenoid valve 13 to stop the supply of air to the actuator 10 to hold the sensor 8 in position in contact with the stop 12, as shown in FIG. 6.

Figure 7:
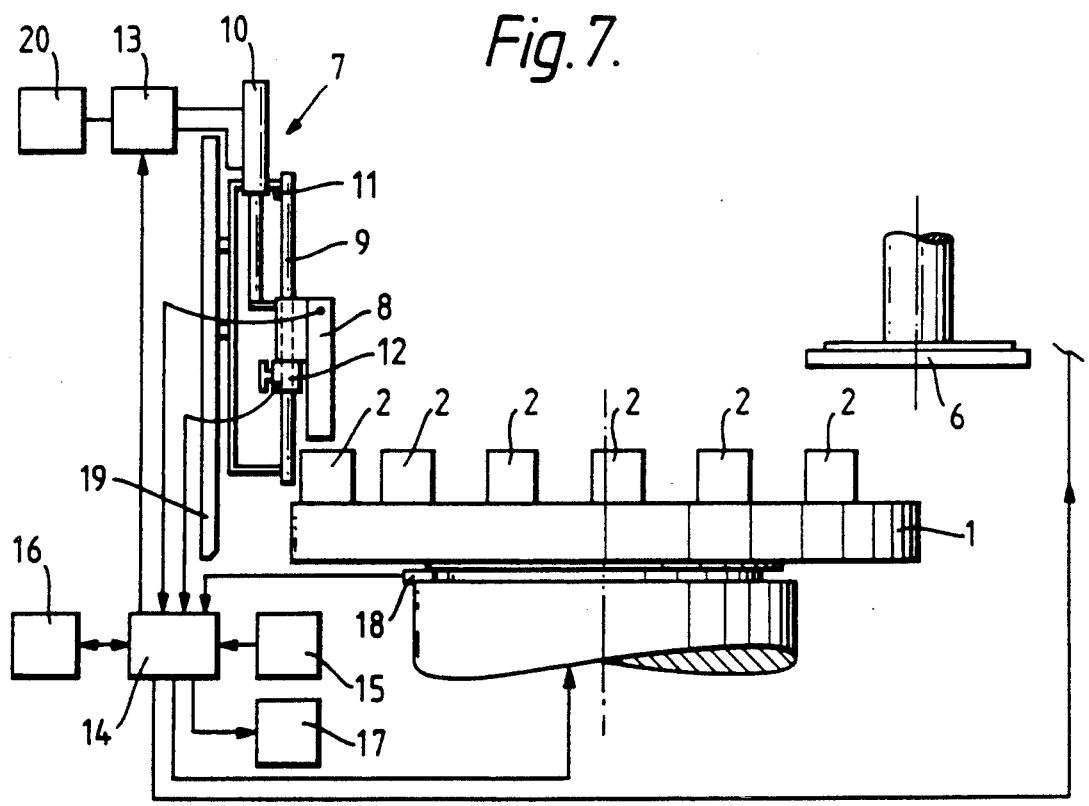

The eddy current sensor 8 then remains in this position and continuously senses the distance to the tops of the components 2 as the grinding operation continues until this distance is equal to the distance to the datum block measured earlier. When the distances are equal the processor 14 instructs the table 1 to stop and the grinding wheel 6 to stop and withdraw away from the table 1, as shown in FIG. 7 and displays a pre-set message on the VDU 17 to inform the operator that the grinding operation has finished.

More components 2 can be ground by using them to replace the finished components. Provided stop 12 is not moved and the angular positions of the new component 52 are the same as the angular positions of the old components 2 the system 7 will not need to be set up again before each operation. Generally the angular positions will be the same because they will be dictated by the system used to secure the components 2 to the machine table 1.

Although the example given is a grinding operation this method could be applied to any machining operation in which material is removed from a workpiece.

The datum block 3 has the same height as the components 2 because the height of the components 2 is the dimension altered by the grinding operation, in other sorts of machining operations, such as turning, appropriate dimensions, such as radius, would need to be measured.

Instead of a position sensor 18 a trigger switch arranged to supply a voltage to the processor 14 each time the table 1 reaches a pre-set position could be used.

I claim:

1. A method of monitoring the progress of a machining operation on a workpiece using a distance sensor supported by a supporting structure allowing the movement of the sensor relative to the workpiece, this movement having a limit at a position where a workpiece having a dimension the same as that of a machined workpiece would be within an accurate measuring range of the sensor, including the steps of;
   (i) during the machining operation, moving the sensor towards the workpiece until the separation of the workpiece and sensor reaches a pre-set value or the sensor reaches the limit of its movement,
   (ii) if the separation of the workpiece and sensor reaches the pre-set value the sensor is moved away from the workpiece again and the sequence is repeated from step i,
   (iii) if the sensor reaches the limit of its movement it remains in this position and measures the separation of sensor and workpiece.

2. A method as claimed in claim 1 and including a further step after step iii; (iv) when the separation of the sensor and the workpiece is equal to the separation of the sensor from a workpiece having a dimension the same as that of a machined workpiece the machining operation is stopped.

3. A method as claimed in claim 1 in which the limit of the movement of the sensor is set by putting a datum object having a dimension the same as that of a machined workpiece in the position occupied by the workpiece during machining, then moving the sensor until the datum object is within an accurate measuring range of the sensor and then limiting the sensors movement to stop a this point.

4. A method as claimed in claim 2 in which the limit of the movement of the sensor is set by putting a datum object having a dimension the same as that of a machined workpiece in the position occupied by the workpiece during machining, then moving the sensor until the datum object is within an accurate measuring range of the sensor and then limiting the sensors movement to stop at this point.

5. A method as claimed in claim 4 in which the separation of the sensor from a workpiece having a dimension the same as that of a machined workpiece used in step iv is the distance between the datum object and the sensor when the sensor is at the limit of its movement.

6. A method as claimed in claim 1 in which the sensor is an eddy current distance sensor.

7. A method as claimed in claim 1 in which an actuator is used to move the sensor.

8. A method as claimed in claim 1 in which the method is carried out automatically under the control of an electronic processor.

9. A method as claimed in claim 1 where the machining operation is a grinding operation.

* * * * *